United States Patent [19]

Katou et al.

[11] Patent Number: 5,010,549
[45] Date of Patent: Apr. 23, 1991

[54] PACKET DATA GENERATOR

[75] Inventors: Hiromi Katou, Atsugi; Hirokazu Kobayahsi, Saitama, both of Japan

[73] Assignee: Kabushiki Kaisha Kenwood, Tokyo, Japan

[21] Appl. No.: 340,811

[22] Filed: Apr. 20, 1989

[30] Foreign Application Priority Data

Apr. 23, 1988 [JP] Japan .................................. 63-99350

[51] Int. Cl.$^5$ ............................. H04J 3/12; H04J 3/24
[52] U.S. Cl. ................................. 370/110.1; 370/94.1; 455/4; 381/2; 381/80; 381/81
[58] Field of Search ..................... 370/94.1, 94.2, 110.1, 370/60, 60.1, 84, 112, 69.1, 71, 73, 124, 76; 381/2, 16, 77, 80, 81; 455/2, 3, 4, 5, 6; 340/825.07, 825.52, 825.53; 358/84, 85, 86, 141, 142, 143, 144, 258; 360/49; 365/230.01, 230.02, 230.03, 230.04

[56] References Cited

U.S. PATENT DOCUMENTS

| 4,216,533 | 8/1980 | Ichimiya et al. | 365/230.04 |
| 4,379,947 | 5/1983 | Warner | 381/2 |
| 4,569,041 | 2/1986 | Takeuchi et al. | 370/60 |
| 4,665,514 | 5/1987 | Ching et al. | 370/94.1 |
| 4,811,277 | 3/1989 | May et al. | 370/94.1 |
| 4,873,684 | 10/1989 | Kobayashi et al. | 370/84 |
| 4,875,196 | 10/1989 | Spaderna et al. | 365/230.04 |
| 4,922,483 | 5/1990 | Kobayashi | 381/81 |
| 4,939,722 | 7/1990 | Beichler | 370/84 |
| 4,949,394 | 8/1990 | Shiraishi et al. | 455/4 |

Primary Examiner—Benedict V. Safourek
Assistant Examiner—Wellington Chin
Attorney, Agent, or Firm—Sixbey, Friedman, Leedom & Ferguson

[57] ABSTRACT

A packet data generator for generating complementary packet data which are added to information data for packet transmission via a high speed PCM transmission line. The packet data generator includes first and second memories for storing the complementary packet data; an address counter for counting an address at the timing of a synchronization signal of the high speed PCM transmission line; a multiplexer for changing the connection of the first and second memories; and a synchronization circuit for outputting a switching signal to the multiplexer in synchro with an output from the address counter. Since two memories are provided, while one memory is used for supplying complementary packet data at the data transmission speed, the other memory can be used for storing new complementary packet data at the CPU processing speed. The new complementary packet data are supplied by switching from the one memory to the other memory in synchro with a synchronization signal of the high speed PCM transmission line.

2 Claims, 2 Drawing Sheets

PACKET DATA GENERATOR

BACKGROUND OF THE INVENTION

1. Field of the Invention

The present invention relates to high speed PCM data transmission, and more particularly to a packet data generator suitable for changing the content of completed packet data including such as addresses to be added to PCM information data, independently on the PCM data transmission rate and without intercepting data transmission.

2. Description of the Related Art

A packet data generator generates completed packet data to be added to information data for packet transmission via a high speed PCM transmission line. In a conventional packet data generator as exemplarily shown in FIG. 2, completed packet data generated by a packet data generator 21 are multiplexed on information data from a main data transmitter at a PCM multiplexer circuit 22, and the multiplexed data are transmitted over a PCM transmission line 23.

In a conventional packet data generator, however, the packet data generator 21 is directly coupled to the PCM multiplexer circuit 22 so that if the content of completed packet data is required to be changed, such data change should be made at the same speed as the PCM data transmission rate.

SUMMARY OF THE INVENTION

The present invention has been made in consideration of the above problem. It is therefore an object of the present invention to provide a packet data generator capable of changing the content of completed packet data to be added to PCM information data, independent of the PCM data transmission rate and without intercepting data transmission.

According to an aspect of the present invention, a packet data generator for generating completed packet data which are added to information data for packet transmission via a high speed PCM transmission line, comprises: first and second memory means for storing said completed packet data; an address counter for counting an address at the timing of a synchronization signal of said high speed PCM transmission line; a multiplexer for changing the connection of said first and second memory means; and a synchronization circuit for outputting a switching signal to said multiplexer in synchronism with an output from said address counter.

According to the packet data generator of this invention, one of first and second memory means is used for reading completed packet data, and the other is used for writing complementary packet data. First and second memory means are interchanged between read and write operations in synchronism with an output from the address counter.

Therefore, in order to change the content of completed packet data, new completed packet data are written beforehand in one of the first and second memory means. After having written the new completed packet data, the one of the first and second memory means is replaced with the other to read the new completed packet data therefrom. It becomes therefore possible to change the content of completed packet data, independently of the PCM data transmission rate and without intercepting data transmission.

DETAILED DESCRIPTION OF THE INVENTION

A preferred embodiment of the packet data generator according to this invention will be described with reference to the block diagram shown in FIG. 1.

Figure 1:
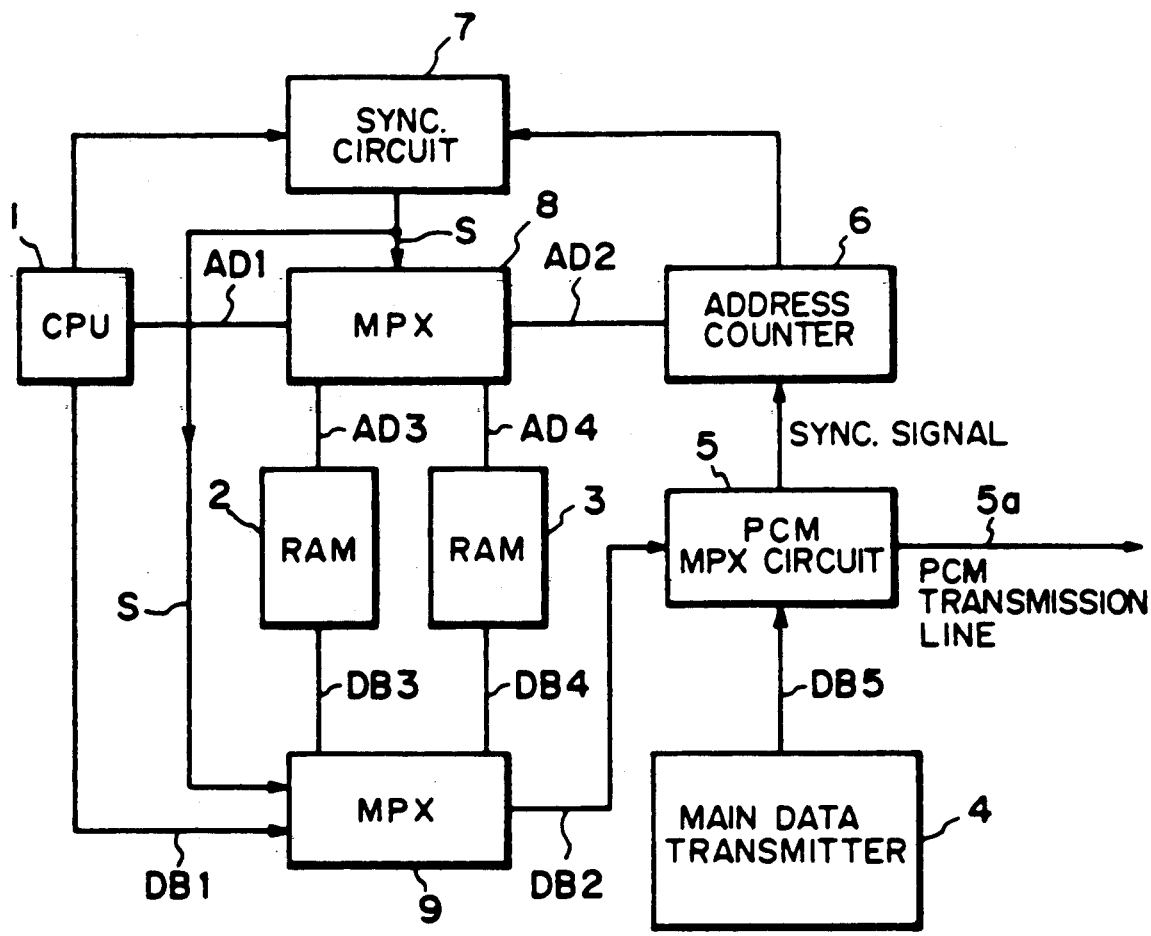
FIG. 1 is a block diagram showing an embodiment of the packet data generator according to the present invention.
Figure 2:
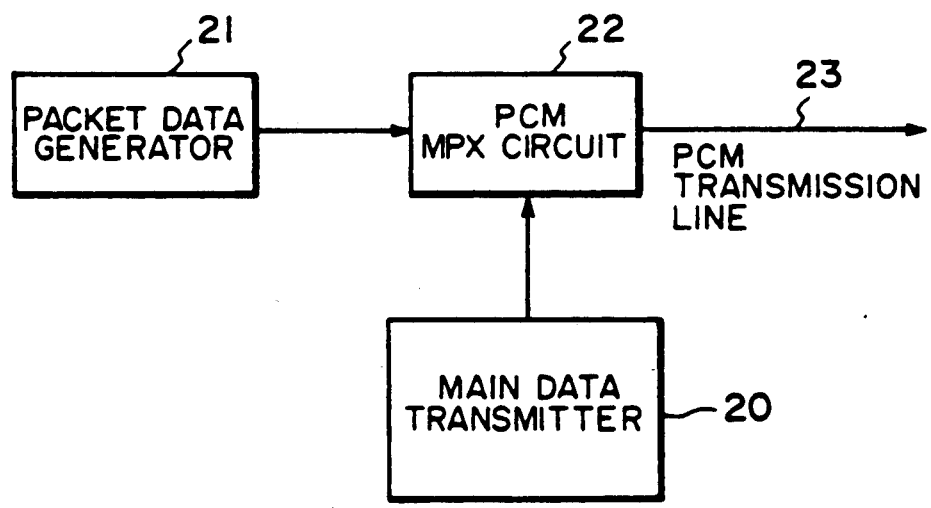
FIG. 2 is a block diagram showing a conventional packet data generator.

Referring to FIG. 1, a microcomputer (hereinafter simply called CPU) 1 generates completed packet data (hereinafter simply called packet data). A RAM 2 or first memory means stores packet data generated by CPU 1. A RAM 3 or second memory means also stores packet data generated by CPU 1. A main data transmitter 4 supplies main transmission data. A PCM multiplexer circuit 5 multiplexes together the main transmission data and packet data from RAM 2 or RAM 3, and sends the multiplexed data over a PCM transmission line 5a. An address counter 6 is used for addressing the packet data in RAM 2 or RAM 3, the count operation thereof being performed at the same speed as the PCM data transmission rate. A synchronization circuit 7 supplies a switching signal to multiplexers 8 and 9 in synchronism with an output from the address counter 6. The multiplexer 8 is used for switching among address busses to RAM 2 and RAM 3, whereas the multiplexer 9 is used for switching among data busses to RAM 2 and RAM 3.

Address bus AD1 is coupled between CPU 1 and multiplexer 8, address bus AD2 between multiplexer 8 and address counter 6, address bus AD3 between multiplexer 8 and RAM 2, and address bus AD4 between multiplexer 8 and RAM 3.

Data bus DB1 is coupled between CPU 1 and multiplexer 9, data bus DB2 between multiplexer 9 and PCM multiplexer circuit 5, DB3 between multiplexer 9 and RAM 2, and DB4 between multiplexer 9 and RAM 3.

The address counter 6 counts an address of RAM 2 or RAM 3 in synchronism with a synchronization signal of the PCM multiplexer circuit 5. The address counter 6 controls the synchronization circuit 7 to supply a synchronization signal S to the multiplexers 8 and 9 in such a manner that RAM 2 and RAM 3 are switched between the CPU 1 side and the address counter 6 and PCM multiplexer circuit 5 side, in synchronism with an output from the address counter 6.

The main data outputted from the main data transmitter 4 and the packet data from RAM 2 or RAM 3 are multiplexed together at the PCM multiplexer circuit 5, and the multiplexed data are transmitted out to the PCM transmission line 5a.

In operation of the packet data generator constructed as above, at the initial condition upon turning on the power, address bus AD1 is connected to address bus AD3, and address bus AD2 to address bus AD4, respectively via the multiplexer 8. On the other hand, data bus DB1 is connected to data bus DB3, and data bus DB2 to data bus DB4, respectively via the multiplexer 9. In this condition, CPU 1 and RAM 2 are being operatively connected by means of address busses AD1 and AD3 and data busses DB1 and DB3. Therefore, CPU 1 generates packet data to be repeatedly supplied to the PCM multiplexer circuit 5, and writes the packet data into RAM 2 at the data processing speed of CPU 1, in accordance with the packet data format. CPU 1 informs the synchronization circuit 7 of a completion of packet data write operation.

Upon completion of packet data write operation, connection between CPU 1 and RAM 2 is released. On the contrary, address bus AD3 is connected to address bus AD2, and data bus DB3 to data bus DB2. Therefore, the packet data from RAM 2 and the main data are multiplexed together at the PCM multiplexer circuit 5, and the multiplexed data are transmitted out to the PCM transmission line 5a.

Unless the content of packet data is changed, the packet data in RAM 2 are repeatedly supplied to the PCM multiplexer circuit 5, and multiplexed on the main data to transmit the multiplexed data onto the PCM transmission line 5a.

If the content of packet data on data bus DB2 is to be changed, the following operation is performed.

In response to a packet data rewrite instuction, multiplexers 8 and 9 make a connection between address busses AD1 and AD4 and connection between data busses DB1 and DB4 to provide RAM3 with writing addresses and new packet data from CPU1.

Since CPU 1 is now operatively connected to RAM 3, the new packet data generated by CPU 1 are written in RAM 3. Upon completion of write operation, the multiplexers 8 and 9 are supplied with a switching signal S in synchronism with an output from the address counter 6 to switch between RAM 2 and RAM 3 switch the busses AD3 to AD4 and DB3 to DB4 for connection RAM3 to address counter 6 and CPU 1. Then, the new packet data in RAM 3 are read and sent onto data bus DB2, and via the PCM multiplexer circuit 5 to the PCM transmission line 5a.

As described above, according to the packet data generator of this invention, memory read and write operations can be executed independently at a same time. It is not necessary for the memories to be read and written at the same speed, but an independent and different speed may be used for both read and write operations. Therefore, data in a memory can be read at high speed independent of the data write speed.

Further, since the memories are interchanged at the timing of a synchronization signal of the high speed PCM transmission line, packet data can be changed without intercepting data transmission.

RAMs used in the above embodiment may be replaced with magnetic recording medium.

According to the packet data generator of this invention, new packet data to be changed are written beforehand in one of two memories. It becomes possible therefore to change the content of complementary packet data, independent of the PCM data transmission rate and without intercepting data transmission.

Figure 3:
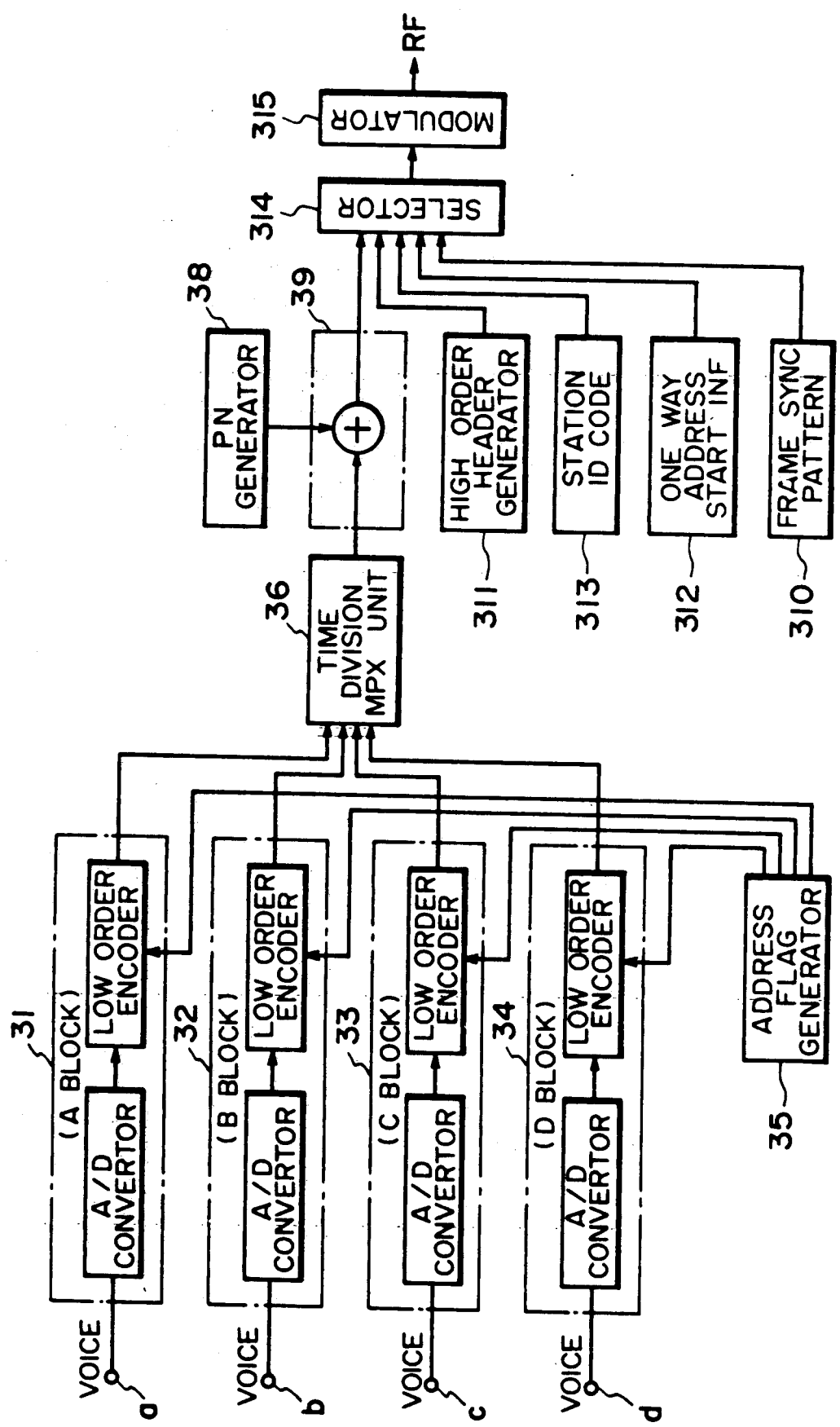
FIG. 3 is a block diagram of one way address system transmitter to which the present invention is applied.

FIG. 3 shows one way address transmission system of the PCM music broad casting wherein the address of subscriber receiver is transmitted. The present invention is used in this system to update the address with keeping the address transmission.

In FIG. 3, a, b, c and d denote input terminals to input different voice signals; 31, 32, 33 and 34 indicate encoders comprising A/D converters and low order encoders for sampling, digitizing, and encoding the voice signals which were respectively input from the input terminals a, b, c and d, thereby formatting so as to obtain the low order frame arrangement. 35 is an address flag generator for encoding the individual address information as the information indicative of the presence or absence of the contract of the receivers corresponding to the voice signals which are input to the encoders 1 to 4 into the address flags $A_3$. 36 is a time division multiplexer unit for multiplexing the low order frame signals as the output signals of the encoders 1 to 4 into the high order frame signal. 38 is a PN generator to generate a pseudo random signal to execute the scrambling operation for encoding. 39 is a scramble unit to scramble total 8128 bits comprising the voice data, address flag, and error correction code in the high order frame signal as the output of the time division multiplexer unit 36. 310 is a frame sync pattern generator to generate the frame sync pattern. 311 is a high order header generator to generate the high order header. 312 is a ONE WAY ADDRESS START INF generator to generate the ONE WAY ADDRESS START INF section. 313 is a STATION ID CODE generator to generate the STATION ID CODE section. 314 is a selector to sequentially transmit to a modulator the output signal of the scramble unit 39 and the output signals of the frame sync pattern generator 310, high order header generator 311, ONE WAY ADDRESS START INF generator 312, and STATION ID CODE generator 313. 315 is a modulator to modulate (for instance, four-phase DPSK modulation) the carrier by the signal obtained by time divisionally multiplexing an output of the selector 314. An RF (high frequency) signal as an output of the modulator 315 is output onto a CATV line. The present invention is applicable to the address flag generator 35 in the system of FIG. 3.

What is claimed is:

1. Data transmission system including a PCM main data source for generating a PCM main data, a PCM additional data source for generating a PCM additional data and a multiplexer for multiplexing the PCM main data and additional data in a predetermined rate for transmission, said PCM additional data source comprising:

first and second memories for storing the PCM additional data;

a processor unit that is operative in a different rate from said predetermined rate for recruiting the PCM additional data stored in the memories; and an address counter that is operative in synchronization with said predetermined rate of said multiplexer for generating addresses to be applied to one of said memories;

wherein one of said first and second memories is connected to said address counter and multiplexer so that the PCM input data stored in said one memory is read-out with the addressing by said address counter in synchronization with said predetermined rate and supplied to said multiplexer for transmission; and the other of said first and second memories in response to a request of requiring a PCM input data to be transmitted, is connected to said processor unit so that the PCM input data stored in the other memory is rewritten with the addressing and data provided by said processor unit operating in said different rate, and in response to the completion of the rewriting is then connected to said address counter and multiplexer in place of said one memory.

2. Data transmission system according to claim 1 wherein said PCM main data source generates a music data and said PCM additional data source generates an address data for a subscriber receiver, the address data being added to the music data.

* * * * *